United States Patent
Doyle et al.

(10) Patent No.: US 9,878,925 B2
(45) Date of Patent: *Jan. 30, 2018

(54) FILTRATION MEDIUM COMPRISING A THERMOLYSIS PRODUCT OF A CARBON OXYCHALCOGENIDE AND A METAL SALT, METHOD OF REMOVING CHLORAMINE WITH THIS FILTRATION MEDIUM AND METHOD OF MAKING THIS FILTRATION MEDIUM

(71) Applicant: 3M INNOVATIVE PROPERTIES COMPANY, St. Paul, MN (US)

(72) Inventors: Meredith McMurdo Doyle, St. Paul, MN (US); Allen R. Siedle, Bloomington, IN (US); Mark R. Stouffer, Middletown, CT (US); Thomas E. Wood, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 594 days.

This patent is subject to a terminal disclaimer.

(21) Appl. No.: 14/366,207

(22) PCT Filed: Dec. 18, 2012

(86) PCT No.: PCT/US2012/070297
§ 371 (c)(1),
(2) Date: Jun. 17, 2014

(87) PCT Pub. No.: WO2013/096281
PCT Pub. Date: Jun. 27, 2013

(65) Prior Publication Data
US 2014/0319061 A1 Oct. 30, 2014

Related U.S. Application Data

(60) Provisional application No. 61/578,971, filed on Dec. 22, 2011.

(51) Int. Cl.
| | |
|---|---|
| *B01J 20/02* | (2006.01) |
| *B01J 20/20* | (2006.01) |
| *B01J 20/30* | (2006.01) |
| *B01J 20/32* | (2006.01) |
| *C02F 1/28* | (2006.01) |
| *C02F 1/72* | (2006.01) |
| *C02F 101/12* | (2006.01) |
| *C02F 101/16* | (2006.01) |

(52) U.S. Cl.
CPC ........... *C02F 1/288* (2013.01); *B01J 20/0262* (2013.01); *B01J 20/0281* (2013.01); *B01J 20/0285* (2013.01); *B01J 20/0288* (2013.01); *B01J 20/0292* (2013.01); *B01J 20/0296* (2013.01); *B01J 20/20* (2013.01); *B01J 20/3078* (2013.01); *B01J 20/3204* (2013.01); *B01J 20/3236* (2013.01); *B01J 20/3244* (2013.01); *C02F 1/283* (2013.01); *C02F 1/725* (2013.01); *C02F 2101/12* (2013.01); *C02F 2101/16* (2013.01)

(58) Field of Classification Search
CPC ............... B01J 20/0262; B01J 20/0281; B01J 20/0285; B01J 20/0288; B01J 20/0292; B01J 20/0296; B01J 20/20; B01J 20/3078; B01J 20/3204; B01J 20/3236; B01J 20/3244; C02F 1/283; C02F 1/288; C02F 1/70; C02F 1/705; C02F 1/725; C02F 2101/12; C02F 2101/16; C02F 2303/185

See application file for complete search history.

(56) References Cited

U.S. PATENT DOCUMENTS

| | | | |
|---|---|---|---|
| 3,950,253 A * | 4/1976 | Stern ................. | C02F 1/003 210/282 |
| 4,666,610 A | 5/1987 | Kuhns | |
| 5,338,458 A | 8/1994 | Carrubba | |
| 5,356,849 A | 10/1994 | Matviya | |
| 5,504,050 A | 4/1996 | Hayden | |
| 6,120,698 A | 9/2000 | Rounds | |
| 6,270,822 B1 * | 8/2001 | Frazier ................. | C02F 1/283 210/282 |
| 6,419,837 B1 | 7/2002 | Aske | |
| 6,451,209 B1 | 9/2002 | Kaas | |
| 6,699,393 B2 | 3/2004 | Baker | |
| 6,706,194 B2 | 3/2004 | Baker | |

(Continued)

FOREIGN PATENT DOCUMENTS

| | | |
|---|---|---|
| JP | S50-062192 | 5/1975 |
| JP | 63-000496 | 1/1988 |

(Continued)

OTHER PUBLICATIONS

Asano, Y., "Formation and Properties of Plasma-Polymerized Carbon Disulfide Films", *Japn. J. Appl. Phys.*, vol. 22, p. 1618-1622 (1983).
Blayden, H. E. et al., "Solid Complexes of Carbon and Sulphur-I. Sulphurised Polymer Carbons", *Carbon*, vol. 5, p. 533-544 (1967).
Bock, H., et al., "Gas-Phase Reactions", *J. Am. Chem. Soc.*, vol. 108, p. 7844-7846 (1986).
Cal, M. P., et al., "High temperature hydrogen sulphide adsorption on activated carbon II. Effects of gas temperature, gas pressure and sorbent regeneration", *Carbon*, vol. 38, p. 1767-1774 (2002).
Chang, C. H., "Preparation and Characterization of Carbon-Sulfur Surface Compounds", *Carbon*, vol. 19, p. 175-186 (1981).
Chou, J.-H., et al., "Solvatothermal Routes to Poly(carbon monosulfide)s Using Kinetically Stabilized Precursors", *J. Am. Chem. Soc.*, vol. 119, p. 4537-4538 (1997).
Crabtree, R.H., "Resolving Heterogeneity Problems and Impurity Artifacts in Operationally Homogeneous Transition Metal Catalysts", *Chem. Rev.*, vol. 112, p. 1536-1554 (2012).

(Continued)

*Primary Examiner* — Lucas Stelling
(74) *Attorney, Agent, or Firm* — Julie Lapos-Kuchar

(57) ABSTRACT

Described herein is a filtration medium comprising a substrate, wherein the substrate comprises a thermolysis product of (i) a carbon substrate having a surface of $CO_xE_y$, wherein E is selected from at least one of S, Se, and Te; and wherein x and y are greater than 0; and (ii) a metal salt; and methods of removing chloramine from aqueous solutions.

12 Claims, No Drawings

(56) References Cited

U.S. PATENT DOCUMENTS

| | | | |
|---|---|---|---|
| 7,097,773 | B1 | 8/2006 | Furlough |
| 7,361,280 | B2 | 4/2008 | Baker |
| 7,727,931 | B2 | 6/2010 | Brey |
| 8,887,923 | B2 | 11/2014 | Stouffer et al. |
| 9,403,695 | B2* | 8/2016 | Siedle ............... B01J 20/20 |
| 9,446,328 | B2* | 9/2016 | Stouffer ............. C02F 1/288 |
| 2002/0112609 | A1 | 8/2002 | Wong |
| 2005/0023211 | A1 | 2/2005 | Koslow |
| 2005/0127323 | A1 | 6/2005 | Tyler |
| 2009/0039028 | A1 | 2/2009 | Eaton |
| 2011/0296991 | A1 | 12/2011 | Hughes |
| 2013/0023405 | A1* | 1/2013 | Hitomi ............... B01J 21/18 502/180 |

FOREIGN PATENT DOCUMENTS

| | | |
|---|---|---|
| JP | 2011-521775 | 7/2011 |
| WO | WO 1997/047380 | 12/1997 |
| WO | WO 2011/125504 | 10/2011 |
| WO | WO 2013/039675 | 3/2013 |
| WO | WO 2013/096074 | 6/2013 |
| WO | WO 2013/096079 | 6/2013 |

OTHER PUBLICATIONS

Doxsee, D. Et al., "New Carbon Sulfides Based on 4,5-Dimercapto-1,2-dithiole-3thione ($\beta$-$C_3S_5^{2-}$): [$C_3S_5$] $C_6S_8$, and $C_5S_7$", *Inorg. Chem.* vol. 32, p. 5467-5471 (1993).

Figueiredo, J. J., et al., "Modificationof the surface chemistry of activated carbons", *Carbon*, vol. 37, p. 1379-1389 (1999).

Flammang, R., et al., "Formation of thiophenethiols by flash vacuum pyrolysis of 1,6,6a$\lambda^4$-trithiapentalenes", *J. Chem. Soc. Perkin Trans.* 2, p. 1261-1264 (1997).

Fu, Jun et al. "Mechanism of Cu(II)-catalyzed monochloramine decomposition in aqueous solution", *Science of the Total Environment*, vol. 407, p. 4105-4109 (2009).

Galloway, C.P. et al., "Binary Carbon Sulfides Based on the $\alpha$-$C_3S_5$ Subunit and Related C—S—O, C—S—Cl, and C—S—N Compounds", *Inorg. Chem.*, vol. 33, p. 4537-4544 (1994).

Hsi, H. C., et al., "Effects of Sulfur Impregnation Temperature on the Properties and Mercury Adsorption Capacities of Activated Carbon Fibers (ACFs)", *Environ. Sci. Tech.*, vol. 35, p. 2785-2791 (2001).

Jacangelo, J. G., et al., "Oxidation of Sulfhydryl Groups by Monochloramine", *Water Res.*, vol. 21, p. 1339-1344 (1987).

Komorita, J. D., et al., "Technical Note: Monochloramine Removal From Water by Activated Carbon", *J. Am. Water Works Assoc.*, vol. 77, No. 1, p. 62-64 (1985).

Krishnan, K. A., et al., "Uptake of Heavy Metals in Batch Systems by Sulfurized Steam Activated Carbon Prepared from Sugarcane Bagasse Pith", *Ind. Chem. Res.*, vol. 41, p. 5085-5093 (2002)

Krivoshei, I. V. et al., "Conjugated Inorganic Carbon-based Polymers", *Russ. Chem. Rev.*, vol. 50, p. 746-767 (1981).

Kurmaev, E. Z., et al., "Interlayer conduction band states in graphite-sulfur composites", *Phys. Rev. B*, vol. 66, p. 193402-1-193402-3 (2002).

Liang, C. et al., "Mesoporous Carbon Materials: Synthesis and Modification", *Angew. Chem. Int. Ed.*, vol. 47, p. 3696-3717 (2008)

Macías-García, A., et al., "Adsorption of cadmium by sulphur dioxide treated activated carbon", *J. Haz. Mat.*, B103, p. 141-152 (2003)

Maier, G., et al., "Thioxoethenylidene $C_2S$: A Matrix-Spectroscopic Study", *Eur. J. Org. Chem.*, p. 4197-4202 (2004).

Müller, H. et al., "Bis-substitued Tetrathiapentalenes—Novel Building Blocks for Extended Tetrathiafulvalenes and Conducting Polymers", *Tet. Lett.*, vol. 38, p. 3215-3218 (1997)

Pedersen, C. T., et al., "3,6-Dihydro[1,2]dithiolo]4,3-c][1,2]dithiole-3,6-dithione and oxo analogues: a comparative study of the thermal (FVP) and electron ionization (EL) induced fragmentations", *J. Chem. Soc. Perkin Trans.* 2, p. 1403-1406 (1998).

Petit, C., et al., "The role of sulphur-containing groups in ammonia retention on activated carbons", *Carbon*, vol. 48, p. 654-667(2010).

Petit, C., et al., "The effect of oxidation on the surface chemistry of sulphur-containing carbons and their arsine adsorption capacity", *Carbon*, vol. 48, p. 1779-1787 (2010).

Plank, N. O. V., et al., "Thiolation of single-wall carbon nanotubes and their self-assembly", *Appl. Phys. Lett.*, vol. 85, p. 3229-3231 (2004).

Puri, R. R., et al., "Carbon-Sulphur Surface Complexes on Charcoal", *Carbon*, vol. 9, p. 123-134 (1974).

Schumaker, R., et al., "Thiapen Chemistry. 2. Synthesis of 1,3,4,6-Tetrathiapentalene-2,5-dione", *J. Am. Chem. Soc.*, vol. 99, p. 5521-5522 (1977).

Sülzle, D. et al., "Experimental Evidence for the Existence of Polycarbon Oxide Sulfides O($C_n$)S (n=3-5) in the Gas Phase", *J. Am. Chem. Soc.*, vol. 113, p. 48-51 (1991).

Vikesland, P. J. et al., "Reaction Pathways Involved in the Reduction of Monochloramine by Ferrous Ion." *Environ. Sci. Technol.*, vol. 34, p. 83-90 (2000).

Wang, J., et al., "Adsorption of Aqueous Hg(II) by Sulfur-Impregnated Activated Carbon", *Environ. Eng. Sci.*, vol. 26, p. 1693-1699 (2009)

Wepasnick, K. A., et al., "Surface and structural characterization of multi-walled carbon nanotubes following different oxidative treatments", *Carbon*, vol. 49, p. 24-36 (2011).

Yamada, J., et al., "Synthesis of new TTF(s)-fused donors and electrical conductivities of their radical cation salts", *Syn. Met.*, vol. 86, p. 1823-1824 (1997).

PCT Search Report, PCT/US2012/070297, dated 2013.

* cited by examiner

FILTRATION MEDIUM COMPRISING A THERMOLYSIS PRODUCT OF A CARBON OXYCHALCOGENIDE AND A METAL SALT, METHOD OF REMOVING CHLORAMINE WITH THIS FILTRATION MEDIUM AND METHOD OF MAKING THIS FILTRATION MEDIUM

CROSS REFERENCE TO RELATED APPLICATIONS

This application is a national stage filing under 35 U.S.C. 371 of PCT/US2012/070297, filed Dec. 18, 2012, which claims priority to U.S. Provisional Patent Application No. 61/578971, filed Dec. 22, 2011, the disclosures of which are incorporated by reference in their entirety herein.

TECHNICAL FIELD

A filtration medium comprising a thermolysis product of a carbon oxychalcogenide and a metal salt is described.

BACKGROUND

Chloramine is commonly used in low concentration as a secondary disinfectant in municipal water distribution systems as an alternative to chlorination with free chlorine. Concerns over taste and odor of chloramine treated water have led to an increase in the demand for water filters with chloramine removal capabilities.

Carbon particles, such as activated carbon particles, have been used to remove chloramine from aqueous streams. Improvements in removal of chloramine can be achieved by reducing the mean particle diameter of the carbon and by increasing the carbon bed contact time. Although parameters such as contact time and mean particle diameter are known to affect chloramine removal efficiencies, more significant improvements are desired without significantly increasing the pressure drop of filtration media.

U.S. Pat. No. 5,338,458 (Carrubba et al.) discloses an improved process for the removal of chloramine from gas or liquid media by contacting the media with a catalytically-active carbonaceous char.

U.S. Pat. No. 6,699,393 (Baker et al.) shows improved chloramine removal from fluid streams, when the fluid stream is contacted with an activated carbon, which has been pyrolyzed in the presence of nitrogen-containing molecules, versus a catalytically-active carbonaceous char.

SUMMARY

There is a desire to provide a filtration medium, which is less expensive and/or more efficient at the removal of chloramine than currently available filtration media. In some instances, there is also a desire to provide a solid block of carbon to remove chloramine. In other instances, there is a desire to have a granular material that may be used in a packed bed. In still other instances, there is a desire to provide a material that may be used in a web-form.

In one aspect, a filtration device is described comprising: a vessel for treating fluids containing a substrate, wherein the substrate comprises a thermolysis product of (i) a carbon substrate having a surface of $CO_xE_y$, wherein E is selected from at least one of S, Se, and Te; and wherein x and y are greater than 0; and (ii) a metal salt.

In another aspect, a method for removing chloramine from aqueous solutions is disclosed comprising: providing an aqueous solution comprising chloramine and contacting the aqueous solution with a composition comprising a thermolysis product of a carbon substrate having a surface of $CO_xE_y$, wherein E is selected from at least one of S, Se, and Te and wherein x and y are greater than 0; and a metal salt.

In yet another aspect, a method of making a substrate comprising: providing a composition comprising (i) a carbon substrate; (ii) a sulfur, selenium, or tellirium source, or combinations thereof; and (iii) a metal salt; and heating the composition.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed to a carbon substrate comprising a thermolysis product of a carbon oxychalcogenide and a metal salt. It has been found that such compositions may be useful for the removal of chloramine from aqueous solutions.

U.S. Pat. No. 9,403,695 (Siedle et al.) discloses that a carbon substrate comprising a surface of a carbon oxychalcogenide, which can be used to remove chloramines from aqueous solutions. U.S. Pat. Publ. No. 2014-0305882 (Doyle et al.) and U.S. Pat. No. 9446328 (Stouffer et al.) disclose that compositions comprising a thermolysis product of a metal salt may also be used to remove chlormaines from aqueous solutions. All three of these patent applications are herein incorporated by reference in their entirety. It has been discovered that by thermally decomposing metal salts on carbon substrates comprising a surface of a carbon oxychalcogenide, compositions that have improved performance may result.

In one embodiment, a carbon substrate is provided comprising a surface of an oxychalcogenide. The carbon substrate comprising a surface of an oxychalcogenide is then contacted with a metal salt and heated to thermally decompose the metal salt.

In another embodiment, a carbon substrate; a sulfur, selenium, or tellurium source; and a metal salt are provided and then heated to form the substrate.

Carbon Substrate

Carbon has several allotropes, including diamond, graphite, and amorphous carbon. In one embodiment, the carbon substrate comprises a substantial amount of $sp^2$ hybridized carbon. In other words, the carbon substrate has no more than 20%, 15%, 12% or even 10% $sp^3$ hybridized carbon. As the $sp^3$ hybridized carbon content increases, the $sp^2$ hybridized carbon substrate progressively changes into a dense, isotropic network of tetrahedral carbon.

The morphology of the carbon substrate is not particularly limited and may include a non-particulate, a particulate, or an aggregate. Exemplary morphologies include: a carbon block, a carbon monolith, foams, films, fibers, and nanoparticulates such as nanotubes and nanospheres. A non-particulate is a substrate that is not composed of discernable, distinct particles. A particulate substrate is a substrate that has discernable particles, wherein the particle may be spherical or irregular in shape and has an average diameter of at least 0.1, 1, 5, 10, 20, or even 40 micrometers (μm) to at most 75 μm, 100 μm, 500 μm, 1 millimeter (mm), 2 mm, 4 mm, 6.5 mm, or even 7 mm. An aggregate (or a composite) is formed by the joining or conglomeration of smaller particles with one another or with larger carrier particles or surfaces. The aggregates may be free standing (self-supporting against gravity).

Typically, the morphology the carbon substrate will be selected based on the application. For example, particulate with a large particle size is desirable when the compositions of the present disclosure are used in applications requiring low pressure drops such as in beds through which gases or liquids are passed. Granular activated carbon available under the trade designation "RGC" by Mead Westvaco Corp, Richmond, Va. may be preferred in water treatment; Kuraray PGW coconut shell activated carbon, Kuraray Chemical, Osaka, Japan.

The size of the pores of the carbon substrate can be selected based on the application. The carbon substrate may be microporous carbon, macroporous carbon, mesoporous carbon, or a mixture thereof.

Particularly useful are carbon substrates that are substantially disordered and have high surface areas (e.g., at least 100, 500, 600 or even 700 m$^2$/g; and at most 1000, 1200, 1400, 1500, or even 1800 m$^2$/g based on BET (Brunauer Emmet Teller method) nitrogen adsorption). As used herein, substantially disordered means that the carbon substrate has in-plane domain sizes of about 10-50 Å (Angstrom).

In one embodiment, the carbon substrate is comprised of activated carbon, in other words carbon that has been processed to make it highly porous (i.e., having a large number of pores per unit volume), which thus, imparts a high surface area.

Chalcogens

The chalcogens as used herein to refer to sulfur, selenium, tellurium, or combinations thereof. Sources of such chalcogens are described below.

Useful sulfur-containing compounds include, but are not limited to elemental sulfur, $SO_2$, $SOCl_2$, $SO_2Cl_2$, $CS_2$, COS, $H_2S$, and ethylene sulfide.

Useful selenium compounds include but are not limited to elemental selenium, $SeO_2$, and $SeS_2$.

Useful tellurium compounds include but are not limited to elemental tellurium, $TeO_2$, and $(HO)_6Te$.

Metal Salts

The metal salts of the present disclosure may include metal salts or metal complexes. Such salts and complexes may comprise a carboxylate, a nitrogen-containing oxyanion, a sulfur-containing anion, a chloride, a phosphate, and combinations thereof.

Exemplary carboxylates include: oxalates, formates, propionates, acetates, tartrates, benzoates, lactates, and/or citrates.

The nitrogen-containing oxyanion salt may comprise a nitrate and/or a nitrite ion.

The sulfur-containing anions may comprise a sulfate, sulfamate, sulfite, bisulfate, bisulfite, and/or thiosulfate ion.

A chloride salt is a salt comprising a chloride anion, and a phosphate salt is a salt comprising a phosphate ion.

The metal portion of the metal salt may include any metal, however, metals that are acceptable for presence in drinking water are preferred. Exemplary metals include: copper, iron, silver, and manganese.

Exemplary metal salts include: cupric oxalate, ferrous oxalate, cupric acetate, ferric citrate, and copper formate, ferric nitrate, manganous sulfate, copper sulfate, and combinations thereof.

Preparing a carbon substrate comprising a carbon oxychalogenide surface

In one embodiment, the surface of the carbon substrate comprises $CO_xE_y$, wherein E is sulfur, selenium, tellurium, or combinations thereof. In one embodiment, x and y are greater than 0. In one embodiment, x is 0. In another embodiment, x is at least 0.005, 0.01, 0.02, 0.03, 0.04, or even 0.05; and is at most 0.07, 0.08, 0.09, 0.1, 0.12, 0.15, or even 0.2. In one embodiment, y is at least 0.001, 0.005, 0.01, 0.02, 0.03, 0.04, 0.05, or even 0.06; and at most 0.12, 0.14, 0.15, 0.16, 0.18, 0.2, 0.22, 0.25, 0.3, 0.35, or even 0.4.

In one embodiment, the carbon substrate has a surface consisting essentially of $CO_xE_y$, meaning that the surface necessarily includes carbon, oxygen, and E and may also include other atoms so long as the other atoms do not materially affect the basic and novel properties of the invention. In other words, besides carbon, oxygen, and the chalcogen, the surface of the substrate comprises less than 10% or even less than 5% total of other atoms. These other atoms may originate in the starting materials. For example, a carbon substrate, prior to reactions as described in this disclosure, may contain potassium or minor amounts of other elements, which are not removed during manufacturing and thus, are present in the final product.

The surface of the carbon substrate comprising an oxychalcogenide is made by exposing a carbon substrate to a chalogen or chalogen-containing compound, and optionally oxygen. The chalcogen is reacted onto the carbon substrate, by exposing a solid, liquid, or gas form of the chalogen or chalcogen-containing compound to the carbon substrate under heating conditions.

In one embodiment, the sulfur, selenium, and tellurium compounds may be used in combination with one another to generate a carbon oxychalcogenide containing more than one chalcogenide element, for example, sulfur and selenium.

In addition to a chalcogen, the surface of the carbon substrate may also comprise oxygen. The carbon substrate, as received, may contain chemically significant amounts of oxygen attached to surface carbon atoms. For example, according to X-ray photoelectron spectroscopic (XPS) analysis, RGC contains about 2.9 atomic percent of oxygen. This amount of oxygen may be sufficient for the present disclosure but, when higher amounts of surface oxygen are desired, additional oxygen may be incorporated into the carbon.

In one embodiment, additional oxygen may be added to the carbon substrate before exposure to the chalcogen-containing compound. For example, the carbon substrate can be heated in air or treated with aqueous nitric acid, ammonium persulfate, ozone, hydrogen peroxide, potassium permanganate, Fenton's Reagent, or other well known oxidizing agents.

In another embodiment, additional oxygen can be incorporated into the carbon substrate having a surface comprising a oxychalcogenide by carrying out the reaction between the carbon substrate and the chalcogen-containing compound in the presence of air or water. The amount of air used can be limited to prevent combustion of the carbon. Additional oxygen may also be supplied by addition of water or steam, which can be added during the heating reaction or may be present on the surface of the carbon substrates, such as in the case of high surface area carbonaceous materials, particularly hydrophilic oxidized carbons, which chemisorb water. Oxygen may be added during the heating reaction in the form of dioxygen, sulfur dioxide, carbon dioxide, or combinations thereof.

In addition to adding an oxygen source during heating of the carbon and the chalcogen, in an alternative embodiment, the heating is conducted in the absence of added oxygen.

Reactions of elemental carbon typically exhibit large activation energies and so are conducted at high temperature. Reactions used to introduce chalcogens and optionally oxygen into the carbon substrate surface may be conducted at a temperature of at least 200, 250, 300, 400, or even 500° C.; and at most 650, 700, 800, 900, 1000, 1200, or even 1400° C. In one embodiment, as the reaction temperature increases the composition of the present disclosure becomes more efficient at the removal of chloramine.

The thermal reaction may occur in air. However, to control combustion, it is possible to carry out the thermal reaction under vacuum; with a purge, such as a nitrogen purge; or in an inert atmosphere where the air is pulled from the reaction vessel using a vacuum and then dry nitrogen is used to back-fill the reaction vessel.

The chalcogen-containing compound may be used in the solid, liquid or gas form. Reaction temperatures, which are above the boiling point of the chalcogen-containing compounds are used, resulting in solid-gas reaction chemistry.

In one embodiment, the carbon substrate is wetted with a liquid chalcogen-containing compound and then exposed to the reaction temperature and optional oxygen to form the carbon oxychalcogenide surface. These reactions occur at the surface of the carbon substrate. In the case of a porous carbon substrate, the carbon oxychalcogenide may coat (or cover) the surface of the pores of the porous carbon substrate.

The carbon substrate having a surface comprising a cabon oxychalcogenide is obtained via solid-gas (or solid-vapor) chemistry. In reactions of this class, only the outer portions of the carbon substrate are exposed to the reactive gas. Such reactions can become self-limiting in that an overlayer of product inhibits inward diffusion of the gas. In such a case, the new compounds that form are confined to regions near the surface and comprise a surface compound. Generally, this means that reactions occur at depths of 10 nanometers (nm) or less on the carbon substrate to form the $CO_xE_y$ coating.

When the carbon substrate is a large particle, a core-shell structure results, where the core is the carbon substrate, which is covered by a shell or second layer comprising the carbon oxychalcogenide.

Because the reaction is a surface reaction, when the carbon material is in the form of small particles with high surface area (e.g., RGC powder nominally −325 mesh, having a nominal surface area of 1400-1800 $m^2/g$), then the surface and interior of the particle may become coextensive. In one instance there may be no apparent chemical distinction between the outer surface and the interior of the particle. In another instance, the chalcogen content on the bulk can approach or even exceed that on the surface.

The solid-vapor process of this disclosure permits penetration of small molecule reactants into micropores and niches formed by highly irregular surfaces. This results in an advantageous, even distribution of chalcogen.

Because not all of the chalcogenide from the chalcogen-containing compound is incorporated into the carbon substrate surface (e.g., some may be converted to COE or $H_2E$), it may be important to analyze the resulting composition to determine the atom fraction of carbon, oxygen, and chalcogen on the carbon substrate surface.

In the present disclosure, the atom fraction of carbon (C), oxygen (O), and chalcogen (E) on the carbon substrate surface is shown as $CO_xE_y$, where in one embodiment, x is 0 or is at least 0.005, 0.01, 0.02, 0.03, 0.04, or even 0.05; and at most 0.07, 0.08, 0.09, 0.1, 0.12, 0.15, or even 0.2; and y is at least 0.001, 0.005, 0.01, 0.02, 0.03, 0.04, 0.05, or even 0.06; and is at most 0.12, 0.14, 0.15, 0.16, 0.18, 0.2, 0.22, 0.25, 0.3, 0.35, or even 0.4.

In one embodiment of the carbon substrate having a surface comprising a carbon oxychalcogenide, the carbon, oxygen, and chalcogen chemically interact with one another, meaning, that these elements may be combined chemically (i.e., covalent chemical bonding between contiguous elements) or there may be weaker interactions between non-contiguous elements, such as hydrogen bonding.

Based on the analysis of the carbon substrate having a surface comprising an oxychalcogenide, in at least one embodiment, the oxygen and chalcogen are combined chemically on the surface of the carbon substrate. The oxygen and carbon are an integral part of the surface of the carbon substrate and are not easily removed by heating to 400° C. The nature of the structure and bonding of the carbon oxychalcogenides is complex. Carefully deconvoluted XPS (X-ray photoelectron spectroscopy) spectra of the resulting compositions of the present disclosure reveal that sulfur is in four different chemical environments with $S2p_{3/2}$ binding energies of about 162.0, 164.3, 165.8 and 168.9 eV [C(1s)=285.0 eV]. They therefore contain chemically combined sulfur in three formal valence states [S(VI), S(IV) and S(II)] and four different chemical environments. These chemical environments are: (1) S(VI) as in $SO_4^{2-}$ or organic sulfones, C—$SO_2$—C; (2) S(IV) as in organic sulfoxides, C—SO—C; (3) S(II) as in thiophene; and (4) S(II) as in organic sulfides, C—S—C or disulfides, C—S—S—C.

In one embodiment, the carbon substrate having a surface comprising an oxychalcogenide has a high thermal stability. For example, with carbon oxysulfides, significant weight loss under nitrogen does not begin until about 200° C., well above the boiling point of sulfur, indicating that the carbon substrate having a surface comprising an oxychalcogenide are not mere physical mixtures of starting materials.

By using a solid-vapor process to incorporate the carbon oxychalcogenide surface onto the carbon substrate, several advantages may be realized. Because the reaction may be solventless or at least free of organic solvent, no drying operation is needed to isolate the product. Further, there are generally no non-volatile by-products that remain to clog small pores in the solid. If no solvent is used, the process as described herein can be envisioned to run as a continuous process, which can reduce cost and/or increase throughput.

Thermolysis Product of Metal Salts

Thermolysis involves heating a metal salt at or above the temperature at which the metal salt begins to lose metal-bound water, if present, and at which the salt portion of the compound begins to decompose. As used herein a "thermolysis product" refers to a product that results from the dissociation or decomposition of a compound by heat. This thermolysis process is believed to change the nature of the metal salt to a material having a different stoichiometry and composition and different chemical properties, wherein at least a portion of the salt is thermally decomposed and is removed by volatilization as a gas.

In one embodiment, upon thermolysis, the oxidation state of the metal changes. For example, in one embodiment of the present disclosure, the metal in the thermoylsis product comprises at least a portion of the metal with an oxidation state of, for example, $Cu^0$, $Cu^{+1}$, or $Fe^{+2}$.

Although not wanting to be bound by theory, in another embodiment, the thermolysis of the metal salt is thought to produce a material having active surface sites that exhibit enhanced activity for catalyzing the decomposition of chloramines. The production of these surface sites by thermolysis of the metal salt results in materials with chloramines removal properties superior to those that result from utilizing similar metal compounds (such as are observed by X-ray diffraction analysis of the thermolysis product) produced by non-thermolysis methods, e.g., metal oxides derived from more traditional methods or finely divided metals.

The metal salt may be thermally treated in the presence carbon substrates or carbon substrates having a surface comprising an oxychalcogenide. The metal salt may be impregnated into the support prior to thermolysis. For example, a metal salt may be dissolved in a solvent and the resulting solution contacted with the support. The impregnated support then may be heated to form a thermolysis product disposed on the surface of the support.

In another embodiment, metal salts, which are not sufficiently soluble to dissolve in the solvent (i.e., do not completely dissolve in the volume of solvent used in the experiment) may be impregnated into the support by adding the metal salt and the support to the solvent. In time, the metal salt that is dissolved in the solvent can diffuse into the support and deposit thereon, so that the metal salt is incorporated into or onto the support over time.

The metal salt is thermally treated in the presence of carbon. The thermal treatment may be conducted in an air environment or in an inert environment, such as in a nitrogen or argon environment.

The thermolysis temperature, the temperature at which the thermolysis reaction is conducted, may be conducted at a temperature of at least 200, 250, 300, 400, or even 500° C.; and at most 650, 700, 800, 900, 1000, 1200, or even 1400° C. Generally the temperature at which thermolysis is conducted may be determined, by first analyzing the material (e.g., the metal salt or the metal salt impregnated support) to be treated by differential thermal analysis/thermal gravimetric analysis (DTA/TGA) performed under controlled conditions (atmosphere and heating rate) to determine its thermal decomposition behavior. Then trials may then be performed by thermolyzing the material at various temperatures beginning with the onset temperature of decomposition to determine at what point and under what conditions (temperature, time and atmosphere) the most active material is formed.

In one embodiment, as the reaction temperature changes the thermolysis product of the metal salt changes and there may be a select temperature based on the metal salt and support used, which offers a more efficient removal of chloramine. For example, excessive heating of the metal salt can result in "over-firing" of the reaction product, and the activity of the material can diminish. In one embodiment, the presence of a carbon support during the thermolysis treatment can alter the decomposition temperature.

Methods of Preparing

In one embodiment, a carbon substrate is provided comprising a surface of an oxychalcogenide following the preparation described herein. The carbon substrate comprising a surface of an oxychalcogenide is then contacted with a metal salt (for example by impregnation) and heated to thermally decompose the metal salt described herein.

In another embodiment, a carbon substrate is heated in the presence of a sulfur, selenium, or tellurium source and a metal salt to form the composition of the present disclosure.

Composition

The compositions of the present disclosure comprise a thermolysis product of a carbon support, a chalcogen selected from at least one of S, Se, and Te; and a metal salt. Small amounts of other elements may be present, due to impurities present in the metal salt, the carbon support, the chalcogen source, and/or in atmosphere used during the thermal treatment. Impurities are typically less than 5%, 2%, 1%, 0.1%, 0.05%, or even 0.01% of particular impurity atom based on the weight of the composition.

In one embodiment, the composition comprises more than 1.2, 1.3, 1.5, 1.8, 2.0, 4.0, 6.0, 8.0 or even 10.0 mass % sulfur based on the total mass of the composition.

In one embodiment, the composition of the present disclosure comprises less than 0.50, 0.30, 0.10, 0.05, 0.01, or even 0.005 mass % sulfur based on the total mass of the composition.

In one embodiment, the composition of the present disclosure comprises less than 0.90, 0.80, 0.70, 0.50, 0.30, 0.10, 0.05, 0.01, or even 0.005 mass % nitrogen based on the total mass of the composition.

In one embodiment, the composition of the present disclosure is substantially free of hydrogen, comprising less than 0.40, 0.30, 0.20, 0.10, 0.05, or even 0.01 mass % hydrogen based on the total mass of the composition.

Use

In one embodiment, the composition of the present disclosure may be used as a filtration medium. Because of the ability of the substrates of the present disclosure to remove chloramine, in one embodiment, the substrates may be used as a filtration media. Filtration methods as known in the art can be used.

The substrates may be used either alone, or mixed with inert diluents or functionally active materials such as adsorbents. For example the substrate may be mixed intimately or layered in beds with carbon that has higher capacity for adsorption of volatile organic compounds. In this way, an adsorbent system with more than one functionality can be produced.

The substrate of the present disclosure may be used in a powdered form, a granular form, or shaped into a desired form. For example, the substrate of the present disclosure may be a compressed blend of the carbon substrates comprising the substrate and a binder material, such as a polyethylene, e.g., an ultra high molecular weight PE, or a high-density polyethylene (HDPE). In another embodiment, the substrate of the present disclosure may be loaded into web, such as a blown microfiber, which may or may not be compacted such as described in U.S. Publ. No. 2009/0039028 (Eaton et al.) herein incorporated in its entirety.

Because the substrate may comprise a ferromagnetic material, in one embodiment, the substrate may be part of a carbon support such as carbon particles, which can be heated by induction heating to form composite blocks. Typically in making a carbon block monolith, carbon particles are heated in an oven to fuse the carbon particles together. When using ferromagnetic material, a high frequency magnetic field may be used to heat the substrate, causing the carbon support to become fused and form a carbon block monolith. In one embodiment, the magnetic field may oscillate at a frequency in a range from about $10^3$ Hz to about $10^{15}$ Hz.

The use of induction heating to prepare a composite block, may allow more uniform heating and better heat penetration to the core of the composite carbon block and/or increase manufacturing throughput of the carbon block composites. The levels of iron salts versus other metal salts may be varied to optimized the ferromagnetic properties and the chloramine removal properties of the material.

In one embodiment, the substrate is disposed in a fluid conduit, wherein the fluid conduit is fluidly connected to a fluid inlet and a fluid outlet. Such systems may include packed beds. Vessels comprising the substrate may be pressure or gravity to move fluid through the vessel.

In one embodiment, the substrate may be used to remove chloramines from a fluid stream, particularly a liquid fluid stream, more specifically, an aqueous fluid stream. Chloramines are formed from the aqueous reaction between ammonia and chlorine (hypochlorite). Thus, adding ammonia ($NH_3$) to a chlorination system converts chlorine to chloramines Specifically, monochloramine, hereafter referred to as "chloramine," in low concentrations arise from the disinfection of potable water sources. In one embodiment, after contacting the aqueous solution with a composition, as disclosed herein, the resulting aqueous solution comprises a reduced amount of chloramines, for example, at least a 10, 20, 25, 30, or even 50% chloramine reduction as measured by the Chloramine Removal Test, at 180 seconds described in the Example Section below.

Previous publications, such as Vikesland, et al. in Environmental Science and Technologies, 200, 34, 83-90 have suggested that the water soluble forms of the ferrous ion are responsible for the removal of chloramines In one embodiment of the present disclosure, it has been discovered that the metal of the decomposed metal salt responsible for the chloramines removal has limited solubility in water (in other words, a solubility producing metal ion concentrations of less than 2 ppm, 1 ppm, 0.5 ppm, or even 0.1 ppm). When the substrate is washed with water, little to no metal is present in the wash water and the washed substrate retains its activity for chloramine removal. Having an insoluble or limited solubility thermolysis product may be advantageous, because the metal would be immobilized, preventing leaching into the treated water, enable the substrate to be conditioned prior to use, and/or generate longer lifetimes of the filtration media.

In one embodiment, the substrate may be disposed in a fluid conduit, wherein the fluid conduit has a fluid inlet and a fluid outlet, with the filtration media (e.g., carbon substrate) disposed therebetween. A chloramine-containing solution may then be passed from the fluid inlet into the fluid conduit to contact the filtration media. The filtrate (solution passing out of the fluid out) should contain less than 1, 0.5, 0.1, or even less than 0.05 ppm (parts per million) chloramines.

A non-limiting list of exemplary embodiments and combinations of xemplary embodiments of the present disclosure are disclosed below.

Embodiment 1. A filtration device comprising:
a vessel for treating fluids containing a substrate, wherein the substrate comprises a thermolysis product of (i) a carbon substrate having a surface of $CO_xE_y$, wherein E is selected from at least one of S, Se, and Te; and wherein x and y are greater than 0; and (ii) a metal salt.

Embodiment 2. The filtration device of embodiment 1, wherein the metal salt comprises (i) a metal carboxylate; (ii) nitrogen-containing oxyanion; (iii) a sulfur-containing anion; (iv) a metal chloride; (v) a metal phosphate; and (vi) combinations thereof.

Embodiment 3. The filtration device of embodiment 2, wherein the nitrogen-containing oxyanion metal salt comprises a nitrate, a nitrite, and combinations thereof.

Embodiment 4. The filtration device of embodiment 2, wherein the sulfur-containing anions metal salt comprises a sulfate, sulfamate, sulfite, bisulfate, bisulfite, thiosulfate, and combinations thereof.

Embodiment 5. The filtration device of embodiment 2, wherein the metal carboxylate comprises an oxalate, an acetate, a citrate and combinations thereof.

Embodiment 6. The filtration device of any one of the previous embodiments, wherein the metal of the metal salt is copper, iron, manganese, silver, and combinations thereof.

Embodiment 7. The filtration device of any one of the previous embodiments, wherein x is no more than 0.1, and y is 0.005 to 0.3.

Embodiment 8. The filtration device of any one of the previous embodiments, wherein x is 0.01 to 0.1.

Embodiment 9. The filtration device of any one of the previous embodiments, wherein E is sulfur and the sulfur is chemically combined with carbon.

Embodiment 10. The filtration device of any one of the previous embodiments, wherein the filtration device is a water filtration device.

Embodiment 11. The filtration device of any one of the previous embodiments, wherein the substrate comprises less than 0.90, mass % nitrogen based on the total mass of the substrate.

Embodiment 12. The filtration device of any one of the previous embodiments, wherein the substrate comprises greater than 2.0 mass % sulfur based on the total mass of the substrate.

Embodiment 13. A method for removing chloramine from aqueous solutions comprising: providing an aqueous solution comprising chloramine and contacting the aqueous solution with a composition comprising a thermolysis product of a carbon substrate having a surface of $CO_xE_y$, wherein E is selected from at least one of S, Se, and Te and a metal salt wherein x and y are greater than 0.

Embodiment 14. The method of embodiment 13, wherein the metal salt comprises (i) a metal carboxylate; (ii) nitrogen-containing oxyanion metal salt; (iii) a sulfur-containing anion metal salt; (iv) a metal chloride; (v) a metal phosphate; and (vi) combinations thereof.

Embodiment 15. The method of embodiment 14, wherein the nitrogen-containing oxyanion metal salt comprises a nitrate, a nitrite, and combinations thereof.

Embodiment 16. The method of embodiment 14, wherein the sulfur-containing anions metal salt comprises a sulfate, sulfamate, sulfite, bisulfate, bisulfite, thiosulfate, and combinations thereof.

Embodiment 17. The method of embodiment 14, wherein the metal carboxylate comprises an oxalate, an acetate, a citrate, and combinations thereof.

Embodiment 18. The method of any one embodiments 14-17, wherein the metal of the metal salt is copper, iron, manganese, silver, and combinations thereof.

Embodiment 19. The method of any one of embodiments 14-18, wherein x is no more than 0.1, and y is 0.005 to 0.3.

Embodiment 20. The method any one of embodiments 14-18, wherein x is 0.01 to 0.1.

Embodiment 21. The method any one embodiments 14-20, wherein the composition comprises less than 0.90, mass % nitrogen based on the total mass of the composition.

Embodiment 22. The method any one of embodiments 14-20, wherein the composition comprises greater than 2.0 mass % sulfur based on the total mass of the composition.

Embodiment 23. A method of making a substrate comprising:
proviiding a composition comprising (i) a carbon substrate; (ii) a sulfur, selenium, or tellurium source, or combinations thereof; and (iii) a metal salt; and heating the composition.

Embodiment 24. The method of embodiment 23, further comprising reacting the carbon substrate and the sulfur, selenium, or tellurium source, or combinations thereof to form a carbon substrate having a surface of $CO_xE_y$, wherein E is selected from at least one of S, Se, and Te and wherein x and y are greater than 0; contacting the carbon substrate having a surface of $CO_xE_y$ with the metal salt; and then heating the composition.

Embodiment 25. The method of any one of embodiments 23-24, wherein the metal salt comprises (i) a metal carboxylate; (ii) nitrogen-containing oxyanion metal salt; (iii) a sulfur-containing oxyanion metal salt; (iv) a metal chloride; (v) a metal phosphate, and (vi) combinations thereof.

Embodiment 26. The method of embodiment 25, wherein the nitrogen-containing oxyanion metal salt comprises a nitrate, a nitrite, and combinations thereof.

Embodiment 27. The method of embodiment 25, wherein the sulfur-containing oxyanions metal salt comprises a sulfate, sulfamate, sulfite, bisulfate, bisulfite, thiosulfate, and combinations thereof.

Embodiment 28. The method of embodiment 25, wherein the metal carboxylate comprises an oxalate, an acetate, a citrate, and combinations thereof.

Embodiment 29. The method of any one embodiments 24-28, wherein the metal of the metal salt is copper, iron, manganese, silver, and combinations thereof.

Embodiment 30. The method of any one of embodiments 24-29, wherein x is no more than 0.1, and y is 0.005 to 0.3.

Embodiment 31. The method of any one of embodiments 24-29, wherein x is 0.01 to 0.1.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, in=inch, kg=kilograms, min=minutes, mol=mole; M=molar, cm=centimeter, mm=millimeter, ml=milliliter, L=liter, N=normal, psi=pressure per square inch, MPa=megaPascals, and wt=weight.

Testing Methods

Apparent Density Determination

The apparent density of a sample (prepared according to Comparative Examples or the Examples according to the disclosure) was determined by tapping a weighed sample in a graduated cylinder until closest packing was achieved. The closest packing was deemed to occur when tapping did not produce a further decrease in volume of the carbon substrate sample.

Chloramine Test

The chloramine content of water samples was determined from the total chlorine content in the samples. Total chlorine (OCl⁻ and chloramines) concentration was measured by the DPD Total Chlorine Method, Hach Method 8167, which Hach Company claims to be equivalent to USEPA Method 330.5. The free chlorine (OCl—) concentration was periodically measured by the DPD Free Chloramine Analysis, Hach Method 8021, which Hach company claims is equivalent to EPA Method 330.5. Free chlorine was maintained at a negligible concentration (<0.2 ppm), thus, the total chlorine analysis was considered a good approximation of the concentration of chloramines in the water. All reagents and the instruments were those described in the standard Hach Method and can be obtained from Hach Company, Loveland, Colo.

Chloramine Preparation 3 ppm+/−0.3 ppm choramine was prepared by adding the appropriate amount of commercial bleach (5.25% NaOCl) to deionized water. While stirring, 1.5 equivalents of a solution of ammonium chloride in water was added to the bleach solution and stirred for 1 hour. The pH was adjusted to 7.6+/−0.2 by the addition of NaOH or HCl and tested using a pH meter (obtained from Thermo Fisher Scientific, Inc., Waltham, Mass., under the trade designation "ORION 3-STAR").

Chloramine Removal Test

An aqueous chloramine test solution was prepared comprising 3 ppm $NH_2Cl$ (prepared as described above) at a pH 7.6 at 27° C. Immediately prior to the test, the initial total chlorine content of the aqueous chloramine test solution was measured as described in the Chloramine Test above. With continuous stirring, a 0.46 g aliquot of a carbon substrate sample (i.e. a sample prepared according to Comparative Examples or the Examples according to the disclosure) Immediately after mixing, a timer was started. After 30 sec, a 5 mL-aliquot of mixture was removed and within 5 sec of removal, the mixture was passed through a 1-micrometer syringe filter to remove suspended solids. The chloramine content of the filtered aliquot was measured within 30 sec of taking the 5-mL aliquot as described above.

Aliquots from the mixture were taken periodically over the course of 5 minutes and analyzed using the Chloramine Test as described above. The efficiency of the chloramine removal is reported as the % chloramine reduction determined by the equation:

$$\left(1 - \frac{[\text{NH2Cl}]\,filtered\,aliquot}{[\text{NH2Cl}]\,\text{initial}}\right) \times 100$$

| Materials | |
|---|---|
| Material | Description |
| Carbon Substrate B | Activated carbon powder obtained from MeadWestvaco Specialty Chemicals, North Charleston, SC, under the trade designation "AQUAGUARD Powder". This carbon is sold specifically for chloramine reduction. |
| Carbon Substrate A (RGC) | Wood-based activated carbon powder MeadWestvaco Specialty Chemicals, North Charleston, SC, under the trade designation "RGC Powder". |
| Cupric oxalate hemihydrate | Obtained from GFS Chemicals, Inc., Columbus, OH, used as received |

-continued

| Materials | |
|---|---|
| Material | Description |
| Sulfur Powder | 99.5% Alfa Aesar, Ward Hill, MA |
| $MnSO_4 \cdot H_2O$ | Manganous Sulfate Monohydrate Powder, ACS Reagent grade obtained from J. T. Baker. |

Comparative Example A

Carbon Substrate A was tested, without further treatment, using the Chloramine Removal Test. The results are shown in Table 1.

Comparative Example B

Comparative Example B was prepared by combining cupric oxalate hemihydrate (0.63 g,) with Carbon Substrate A (5 g) as a slurry in 75 mL water (target 4.7% loading). The mixture was stirred for 5 days at room temperature. Due to the slight solubility of cupric oxalate hemihydrate, disappearance of the blue colored particulates from solution was indicative of the completion of impregnation (after 5 days in this case). The powder was isolated by filtration and dried at room temperature overnight. The sample was heated in a furnace at 300° C. for 1 hr under nitrogen. The furnace was purged with nitrogen prior to heating. The sample was then cooled to room temperature and tested using the Chloramine Removal Test. The result is shown in Table 1.

Comparative Example C 10 g of Carbon Substrate A was thoroughly mixed with 1 g finely powdered sulfur (nominally 10 wt %) and transferred to a reactor consisting of a 15×1.5 inch (381 mm×38.1 mm) glass tube connected via a 20 mm Solv-Seal joint (Andrews Glass Co., Vineland, N.J.) to a 10 mm greaseless high vacuum stopcock and vacuum line interface. A plug of glass wool was inserted ahead of the stopcock to prevent loss of entrained solids. After outgassing for 30 min, the reactor and contents were heated in a vertical furnace at 400° C. for 1 hr. After cooling to room temperature, the reactor was again evacuated through a liquid nitrogen-cooled trap for 15 min, and then opened to isolate the product. The product was analyzed by X-ray photoelectron spectroscopy (XPS) and the C(1 s), O(1 s) and S(2 $p_{3/2}$) peaks were integrated to determine the surface composition of the product which contained 92.6 atomic % of C, 3.4 atomic % of O, and 3.4 atomic % of S. Bulk chalcogen content of the product determined by combustion analysis was 8+1% of S.

Example 1

Cupric oxalate hemihydrate (0.63 g) was combined with a portion of the sulfided carbon of Comparative Example C (5 g) as a slurry in 75 mL water (target 4.7% loading). The mixture was stirred for 5 days at room temperature. Due to the slight solubility of cupric oxalate hemihydrate, disappearance of the blue colored particulates from solution was indicative of the completion of impregnation (after 5 days in this case). The powder was isolated by filtration and dried at room temperature overnight. The sample was then heated in the same tube reactor used to prepare the sulfided carbon described above while sealed under $N_2$ at 300° C. for 1 hour the sample was then cooled to room temperature and tested using the Chloramine Removal Test. Table 1 summarizes the % chloramine removed from water samples after indicated time (in seconds) elapsed.

TABLE 1

| | Example | | | |
|---|---|---|---|---|
| Time (seconds) | Comp. A | Comp. B | Comp. C | Ex.1 |
| 10 | 6.90 | 42.86 | 33.33 | 68.97 |
| 30 | 17.24 | 71.43 | 56.67 | 89.66 |
| 60 | 24.14 | 82.14 | 70.00 | 96.55 |
| 120 | 34.48 | 92.86 | 86.67 | 96.55 |
| 180 | 41.38 | 96.55 | 86.67 | 96.55 |
| 240 | 48.78 | 96.55 | 93.34 | 96.55 |
| 300 | 55.17 | 96.55 | 96.55 | 96.55 |

Comparative Example D

Carbon Substrate B was tested, without further treatment, using the Chloramine Removal Test. The results are shown in Table 2.

Comparative Example E $MnSO_4.H_2O$ was added to deionized water with vigorous stirring. The aqueous manganese sulfate solution then was added to Carbon Substrate A. The impregnated carbon was then heated in a nitrogen-purged muffle furnace at 875° C. for 15 minutes. The crucible was then removed to cool under a nitrogen purge. The impregnation resulted in approximately 6.3% manganese (as Mn) on the carbon. The sample was tested using the Chloramine Removal Test. The results are shown in Table 2.

Example 2

Carbon substrate A was heated to 180° C. The sulfur powder was added to the heated carbon and the mixture stirred until the sulfur melted into the carbon. The sulfur containing carbon was then heated to 550° C. for 15 minutes in a muffle furnace under a purge of nitrogen. The sample was cooled under nitrogen purge.

$MnSO_4.H_2O$ was added to deionized water with vigorous stirring. The aqueous manganese sulfate solution was added to the carbon treated with sulfur above. The impregnated carbon was then heated in a nitrogen-purged muffle furnace at 875° C. for 15 minutes. The crucible was then removed to cool under a nitrogen purge. The impregnation resulted in approximately 6.3 wt % manganese (as Mn) on the carbon.

The sample of Example 2 was tested using the Chloramine Removal Test. The results are shown in Table 2.

TABLE 2

| Example | Carbon Substrate | Sulfur treated | % Mn in thermolysis precursor | % Chloramine reduction at 150 sec |
|---|---|---|---|---|
| Comp. Example D | B | No | 0 | 82* |
| Comp. Example A | A | No | 0 | 42* |
| Comparative Example E | A | No | 6.3 | 69* |
| Example 2 | A | Yes | 6.3 | 96* |

*Denotes samples, where 1.5 cc of carbon substrate sample was used, instead of the 0.46 g in the Chloramine Removal Test. The 1.5 cc aliquot was measured by mass, knowing the apparent density of the sample.

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A method for removing chloramine from aqueous solutions comprising:
   providing an aqueous solution comprising chloramine and contacting the aqueous solution with a composition comprising a thermolysis product of (a) a carbon substrate having a surface comprising $CO_xE_y$, wherein E is selected from at least one of S, Se, and Te wherein x and y are greater than 0 and (b) a metal salt, wherein the metal comprises at least one of copper, iron, silver, and manganese.

2. The method of claim 1, wherein the metal salt comprises (i) a metal carboxylate; (ii) nitrogen-containing oxyanion metal salt; (iii) a sulfur-containing anion metal salt; (iv) a metal chloride; (v) a metal phosphate; or (vi) combinations thereof.

3. The method of claim 1, wherein x is no more than 0.1, and y is 0.005 to 0.3.

4. The method of claim 1, wherein x is 0.01 to 0.1.

5. The method of claim 1, wherein the composition comprises less than 0.90, mass % nitrogen based on the total mass of the composition.

6. The method of claim 1, wherein the composition comprises greater than 2.0 mass % sulfur based on the total mass of the composition.

7. The method of claim 1, wherein the composition comprises greater than 4.0 mass % sulfur based on the total mass of the composition.

8. The method of claim 2, wherein the sulfur-containing anions metal salt comprises a sulfate, sulfamate, sulfite, bisulfate, bisulfite, thiosulfate, or combinations thereof.

9. The method of claim 2, wherein the metal carboxylate comprises an oxalate, an acetate, a citrate, or combinations thereof.

10. The method of claim 1, wherein E is sulfur and the sulfur is chemically combined with carbon.

11. The method of claim 1, wherein the composition comprises less than 0.70, mass % nitrogen based on the total mass of the composition.

12. The method of claim 1, wherein the composition comprises less than 0.30, mass % hydrogen based on the total mass of the composition.

* * * * *